3,584,080
VULCANIZABLE COMPOSITIONS COMPRISING COPOLYMERS OF AN ISOOLEFIN AND AN AROMATIC DIVINYL COMPOUND

John Walker and Ronald Hindmarch McEuan, Sarnia, Ontario, Canada, assignors to Polymer Corporation Limited, Sarnia, Ontario, Canada
No Drawing. Filed Feb. 11, 1969, Ser. No. 798,441
Claims priority, application Canada, Mar. 7, 1968, 014,193
Int. Cl. C08d 9/08; C08f 29/12
U.S. Cl. 260—889      12 Claims

ABSTRACT OF THE DISCLOSURE

Vulcanizable compositions comprise a copolymer of an isoolefin, an aromatic divinyl compound and, optionally, an aliphatic diene, together with a free-radical curing agent. The compositions preferably comprise also a minor proportion of a covulcanizable rubbery or resinous polymer, such as polyethylene, ethylene/vinyl acetate copolymers, natural rubber or synthetic rubbers vulcanizable by free-radical curing agents.

---

The present invention relates to vulcanizable compositions comprising copolymers of ioolefins and divinyl aromatic compounds to their vulcanization and to vulcanizates so obtained. More particularly, the present invention relates to the use of curing agents which thermally decompose to generate free radicals in the vulcanization of such copolymers.

Rubbery copolymers of isoolefins of 4 to 7 carbon atoms, such as isobutylene, and aliphatic dienes of 4 to 14 carbon atoms, such as isoprene and butadiene, have been known for some time. They are best known by the generic title of "Butyl Rubbers." Such materials are characterized by low chemical unsaturation, provided by the aliphatic diene, and a long chain, linear molecular structure. These two characteristics help explain their typical properties of good resistance to the degradative action of oxygen, ozone, acids, alkalis, heat and sunlight, and low permeability to gases and vapours. The linear polymers are substantially gel-free.

The vulcanization or curing of such copolymers of isoolefins and dienes is most commonly effected by sulphur curing agents, either sulphur itself or sulphur donors, in conjunction with such accelerators as thiazoles, for example, 2-mercapto benzothiazole, benzothiazole disulphide, bis-4-ethylthiazole disulphide and thiazole guanidine, thiocarbamates, for example, zinc dimethyl dithiocarbamate, zinc dibutyl dithiocarbamate and copper dimethyl dithiocarbomate, thiurads, for example, tetramethyl thiuram disulphide and tetraethyl thiuram disulphide, and various others, for example, diphenyl guanidine and aldehydeamines. Non-sulphur curing systems can also be used, for example, quinoid systems involving the use of such compounds as p-quinone dioxime and p,p'-dibenzoylquinone dioxime in conjunction with activating compounds such as red lead; p-dinitroso benzene systems and resin cure systems involving the use of such compounds as polychloroprene and brominated dimethylol phenol resins.

Despite this wide variety of available curing systems it has not hitherto been considered possible usefully to vulcanize butyl rubber copolymers with free-radical curing agents, for example, peroxide curing agents. Thus when peroxide curing agents such as, for example, dicumyl peroxide, are used with butyl rubbers, the result has involved degradation of the polymers. Various mechanisms have been proposed to account for the degradative effect of peroxides on butyl rubbers and it appears likely that it proceeds by means of an initial abstraction of a hydrogen atom, followed by rapid chain scission in the resultant radical. A similar degradative effect is observed in the action of peroxide curing agents on isoolefin homopolymers, such as polyisobutylene. This being the case, it would have been expected that all copolymers in which an isoolefin constitutes the major proportion would degrade when treated with peroxide curing agents.

It has now been found unexpectedly that certain isoolefin copolymers in which the isoolefin constitutes the major proportion can be vulcanized with free-radical curing agents, especially peroxide curing agents, to give vulcanizates of good ozone resistance and remarkable compression-set properties. When these properties are allied to good heat ageing characteristics, it can be seen that the vulcanizates have properties particularly suitable for a number of uses.

Furthermore, the fact that these isoolefin copolymers can be cured with peroxides makes it possible to blend the copolymers with other rubbery or resinous polymers which are curable with free-radical curing agents and to cure the blends so obtained by using free-radical curing agents.

The present invention accordingly provides vulcanizable compositions comprising (a) from 5 to 100 parts by weight of a copolymer prepared by copolymerizing 80 to 99.8% by weight of an isoolefin of 4 to 7 carbon atoms, 0 to 19.8% by weight of an aliphatic diene of from 4 to 14 carbon atoms and from 0.2 to 5% by weight of an aromatic divinyl compound of the formula

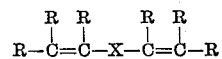

wherein the symbol X represents an aromatic nucleus and the symbols R, which may be the same or different, represent hydrogen atoms or alkyl groups of 1 to 5 carbon atoms, (b) up to 95 parts by weight of a rubbery or resinous polymer vulcanizable by a free-radical curing agent, and (c) from 0.05 to 5 parts by weight of a free-radical curing agent, based on 100 parts by weight of the ingredients (a) and (b).

An advantage which can be realized in practising the invention may be illustrated, merely by way of example, by reference to the preparation of butyl rubber-polyethylene vulcanizates.

It has been known for a considerable period of time that polyethylene is technologically compatible with regular grades of butyl rubber and that when minor proportions of butyl rubber are blended into polyethylene the flexibility, resistance to environmental stress cracking and low temperature properties of polyethylene are improved. Conversely, the addition of minor proportions of polyethylene to butyl rubber improves the hardness, toughness and resistance to oxidative degradation of butyl vulcanizates and the dimensional stability of butyl rubber extrudates. Vulcanizates of butyl-polyethylene blends have been successfully applied to the manufacture of materials such as weather stripping and electrical insulations.

Since hitherto butyl rubbers have been degraded by free-radical generating curing agents, particularly peroxides, and since polyethylene, which is essentially saturated, cannot be cured readily by the curatives conventionally used in the vulcanization of butyl rubbers but can be cured by peroxide curing agents, the requirements for covulcanization of the blend ingredients have, in general, been incompatible. The vulcanization of butyl rubber-polyethylene blends has, therefore, been the subject of much research. Where vulcanization of both ingredients is effected, the solutions postulated have usually involved the use of a vulcanization system for each ingredient allied to special processing or vulcanization techniques to avoid either degradation of the butyl rubber or premature decomposition of a peroxide curing agent intended to cure the polyethylene. The present invention now makes possible the covulcanization of polyethylene and a specific type of butyl rubber using but one common curing agent, namely a free-radical generating curing agent.

Examples of polymers other than polyethylene which may be covulcanized in blends with a butyl rubber in accordance with the invention by the use of free-radical generating curing agents include styrene/butadiene copolymers, butadiene/acrylonitrile copolymers, ethylene/vinyl acetate copolymers, natural rubber, ethylene/butadiene copolymers, ethylene/propylene copolymers and ethylene/propylene/diene terpolymers.

The preparation of isoolefin copolymers which may be used in the vulcanizable compositions of the invention is described in, for example, U.S. patent specification Nos. 2,671,774, 2,729,626, 2,851,335 and 2,781,334. In general, the method of preparation can be said to involve the reaction of a mixture of the monomers dissolved in an inert diluent, which preferably is an alkyl halide, such as methyl or ethyl chloride, in the presence of a Friedel-Crafts catalyst, such as an aluminium halide, especially aluminium chloride, at a temperature in the region of 0° C. to −164° C., preferably in the range −40° C. to −110° C.

The resulting copolymers have a much reduced tendency to cold flow over "regular" butyl rubbers made from the monoolefin and an aliphatic conjugated diene. Indeed one reason why they were originally developed was to overcome the disadvantage of cold flow associated with regular butyl rubbers. The reduced cold flow arises by virtue of the fact that the unvulcanized copolymers having a component derived from a divinyl aromatic compound contain a proportion of cross-links induced by the presence of the divinyl aromatic compound, each vinyl group of which can enter into separate polymer chains. Because of the existence of such cross-links in the uncured polymers, the isoolefin copolymers useful in the vulcanizable compositions of the invention will, for ease of reference, be referred to as "cross-linked butyl" throughout this specification.

Preferred cross-linked butyl copolymers for use in the vulcanizable compositions of the invention are those prepared by copolymerizing 80 to 99.8% by weight of isobutylene, 0 to 19.8% by weight of an aliphatic diene of from 4 to 14 carbon atoms and 0.2 to 4% by weight of aromatic divinyl compound. The preferred isoolefin for use in their preparation hence is isobutylene. Suitable aliphatic dienes include conjugated dienes such as isoprene, piperylene, dimethyl butadiene and methyl pentadienes. Of these isoprene is preferred and especially suitable amounts of this monomer are from 1 to 5% by weight of the monomer mixture. While the aliphatic diene need not be present in the polymerization mixture it can have a moderating influence on the course of the polymerization thus providing a means whereby the molecular weight of the copolymer can be controlled.

The divinyl aromatic compound of general formula:

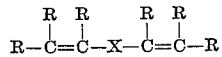

can be derived from such aromatic compounds as benzene, naphthalene, phenanthrene, anthracene and diphenyl by replacement of nuclear hydrogen atoms by vinyl or alkyl-substituted vinyl groups. The nucleus X can also be substituted by, for example, alkyl groups so that suitable compounds include divinyl toluenes and divinyl xylenes, as well as divinyl naphthalene, divinyl pyridine, diisopropenyl benzene and, the preferred compound, divinyl benzene. Preferably the amount of divinyl aromatic compound is from 0.2 to 4% by weight of the monomeric mixture, with amounts of from 0.5 to 3% being especially preferred.

The amount of divinyl aromatic compound specified herein is the amount actually present and not the amount of impure material present. Such divinyl aromatic compounds as are employed in producing cross-linked butyl polymers are frequently impure, containing various impurities usually in the form of hydrogenated derivatives. Thus, for example, one commercially available divinyl benzene generally contains only about 50% by weight of divinyl benzene itself in the form of a mixture of isomers, and the remaining about 50% by weight is constituted by such impurities as ethyl vinyl benzene and diethyl benzene.

The vulcanizable compositions of the invention are produced by compounding the cross-linked butyl polymer with the free-radical curing agent, and optionally, with other ingredients as will be subsequently explained.

The most preferred free-radical curing agents are organic peroxides. Organic peroxide curing agents which may be used in the vulcanizable compositions of the invention include alkyl, aryl, acyl and, preferably, aralkyl peroxides. Such curing agents may be exemplified by dibenzoyl peroxide,
dicumyl peroxide,
di-tertiary butyl peroxide,
di-tertiary amyl peroxide,
2,5-di-(tertiary butylperoxy)-2,5-dimethyl hexane,
2,5-di-(tertiary butylperoxy)-2,5-dimethyl hexyne-3,
di(tertiary butylperoxy isopropyl)-benzene,
1,1-di(tertiary butylperoxy)-3,3,5-trimethylcyclohexane and
4,4-di(tertiary butylperoxy)butyl valerate.

Other free-radical curing agents which may be employed in the compositions of the invention include hydroperoxides, for example cumyl hydroperoxide and t-butyl hydroperoxide, peresters, for example t-butyl perbenzoate, and azo-compounds, for example azo-bis(isobutyronitrile).

The amount of curing agent used in the vulcanizable compositions of the invention should be from 0.05 to 5 parts by weight, based on 100 parts by weight of the polymeric ingredients (a) and (b), and preferably is from 0.2 to 3 parts by weight. Here again the amount of curing agent specified is the amount of curative actually present and is not the amount of impure material which may be used. Thus, for example, dicumyl peroxide, which is one of the most preferred peroxide curing agents, is commercially available as a 40% active material; i.e. only 40% of the material is actually dicumyl peroxide with the remaining 60% constituting a diluent, for example calcium carbonate.

As will be appreciated by those skilled in the art, the nature of the compounding operation involved in preparation of the compositions of the invention will depend upon the constitution of the compositions being formulated. In general terms, however, it may be said that in preparing the vulcanizable compositions of the invention it is preferable to mix the ingredients (a) and (b) before incorporating the free-radical curing agent. Such a method of operation reduces the possibility of premature cure or scorch and makes possible the use of initial mixing temperatures in excess of the decomposition temperature of the curing agent should there be desirable.

The compositions of the invention may, as described above, comprise rubbery or resinous polymers vulcanizable by free-radical curing agents in addition to the cross-linked butyl. These polymers may be either saturated or unsaturated. Examples of such polymers include solid polyethylene, styrene/butadiene copolymers, butadiene/acrylonitrile copolymers, ethylene/vinyl acetate copolymers, ethylene/butadiene copolymers, ethylene/propylene copolymers, ethylene/propylene/diene copolymers and natural rubber. The preferred such material is polyethylene which is commercially available in two basic forms, namely a high density material, prepared at lower temperatures and pressures by specific catalysts, and a low density material, prepared at higher temperatures and pressures. The high density polyethylenes have densities of about 0.94 to 0.96 gm./cc. at 25° C. and crystalline melting points of about 125 to 135° C. while the low density polyethylenes have densities of about 0.90 to 0.93 gm./cc. at 25° C. and crystalline melting points of about 105 to 120° C. While both forms may be used in the compositions of the invention, the low density material is preferred since it blends more readily with the butyl rubber and imparts somewhat improved extrusion and finishing characteristics to the blends as well as better flexibility to finished vulcanized products. Preferred proportions of polyethylene are from 35 to 95 parts by weight, especially 45 to 90 parts by weight, per 100 parts by weight of the combined ingredients (a) and (b).

The compositions of the invention may comprise ingredients additional to those identified as (a) and (b) such as are frequently used in the compounding of rubbery or resinous polymers. Thus they may comprise a filler which may be reinforcing or non-reinforcing in amounts up to, for example, 150 parts, especially 20 to 100 parts, by weight of filler per 100 parts by weight of ingredients (a) and (b). Suitable fillers include carbon blacks, which may be selected from the many grades available including channel blacks, furnace blacks and thermal blacks, and non-black fillers such as silica, whiting, barytes and various clays and other silicates. Preferred amounts of carbon black filler are from 50 to 100, especially 75 to 100, parts of filler per 100 parts by weight of ingredients (a) and (b).

In certain cases the presence of electrically conductive fillers such as carbon black may be disadvantageous. As an instance there may be cited compositions comprising the cross-linked butyl and polyethylene which are intended for use in insulation applications. The presence in such compositions of conductive fillers has the effect of reducing the electrical resistance or insulating properties of the composition and is clearly undesirable. For applications such as these gum, i.e. unfilled, formulations are preferred.

Other ingredients which may be incorporated in the compositions of the invention include plasticizers, for example ester plasticizers, low molecular weight polyolefin plasticizers, terpene plasticizers and natural oil plasticizers, lubricants, for example stearic acid, antioxidants, for example polymerized trimethyl dihydroquinoline and derivatives thereof, and pigments. The presence of some antioxidant is desirable to provide vulcanizates having good heat resistant properties. In this connection it should be noted that when antioxidants are present, it may be necessary to increase the level of curing agent in order to obtain good cure times. The increase in curing agent level need not be in proportion to the level of antioxidant incorporated in the compositions of the invention.

The criteria governing the incorporation of such additional ingredients as fillers, plasticizers, antioxidants and pigments are in large part determined by the intended application for the compositions of the invention and will be familiar to those skilled in the art.

The curing agent and various other ingredients may be incorporated in the compositions of the invention by conventional compounding techniques using, for example roll mills or internal mixers, such as Banbury mixers. The curing agent is preferably the last ingredient to be incorporated in the compositions and should desirably be added under conditions such that little or no decomposition of the curing agent takes place during the compounding operation. To that end the curing agent may be added to an otherwise completely compounded composition on a cold mill, the temperature of the composition having been reduced to a suitably low value. The compounded compositions may be formed into shaped articles by conventional fabricating techniques, for example by extrusion or by moulding.

The conditions under which the compositions of the invention are cured will depend on a number of factors, including the rate of decomposition of the curing agent, the decomposition temperature of the curing agent, the degree of curing desired, the dimensions of the article being cured and the time available. Generally speaking, however, temperatures in the range 130 to 200° C. will be suitable for most curing agents and will result in adequate degrees of curing being achieved within periods of from 1 to 60 minutes.

Merely to illustrate the considerations involved, it is known that about 50% of a given amount of dicumyl peroxide is decomposed after having been heated at the following temperatures for the indicated times;

(a) 125° C. for 205 minutes.
(b) 130° C. for 110 minutes.
(c) 135° C. for 60 minutes.
(d) 140° C. for 32 minutes.
(e) 150° C. for 9.6 minutes.
(f) 160° C. for 2.8 minutes.
(g) 170° C. for 0.8 minute.

Thus when dicumyl peroxide, one of the preferred peroxide curing agents, is employed it is desirable to incorporate it into the blend at a temperature below 150° C. and preferably below about 135° C. to keep decomposition to a suitably low level and thereby to reduce or prevent scorch before effecting vulcanization of the compositions of the invention.

The curing operation should be carried out under conditions known to be suitable for free-radical cures. Thus, for example, the compositions may be cured by heating under pressure in a mould, by continuous cure in molten salt baths or by heating in steam. The latter procedure using horizontal, vertical or catenary vulcanization tubes makes possible the production of unlimited lengths of vulcanizates and is particularly suitable for the production of cable jacketing.

The following examples serve to illustrate the invention. In the examples all parts and percentages are by weight unless otherwise specified.

EXAMPLE I

This example serves to demonstrate that an aromatic divinyl compound should be used in the preparation of the cross-linked butyl polymers for them to be vulcanizable by free-radical curing agents.

A series of copolymers and terpolymers, containing certain combinations of monomers, was prepared using a batch reactor.

Constant weight percentages of diluent and monomer reactants were provided for in the feedstock charged to the reactor as follows:

| | Reaction mixtures (parts) | |
|---|---|---|
| | Copolymer | Terpolymer |
| Methyl chloride | 3,000 | 3,000 |
| Isobutylene | 1,000 | 1,000 |
| Isoprene | | 30 |
| Aromatic monomer | 30 | 30 |

The ingredients were cooled to about −100° C. with good agitation. Catalysts containing 0.43 gms. of aluminium chloride per 100 ml. of methyl chloride was charged into the reaction mixture at the rate of 50 ml. per minute for four minutes. The reaction mixture was maintained at −100° C.±1° C. throughout. 100 mls. of isopropanol were added to the reactor to short-stop the reaction and the reactor contents were poured into isopropanol to volatilize methyl chloride and isobutylene. Unreacted non-volatile monomers were assumed to be dissolved in the isopronanol. The products were mill-dried, weighed and used without further purification.

The polymers, together with a sample of polyisobutylene, were tested for cross-linking by peroxides by compounding in accordance with the recipes 1 and 2 given below, forming into test sheets and curing for 5, 10 or 20 minutes at about 165° C.

| Recipe | Number 1 | Number 2 |
|---|---|---|
| Polymer | 100 | 100 |
| Translink-37 [1] | 50 | 50 |
| DiCup 40 C [2] | 1.5 | 1.5 |
| Triallyl cyanurate [3] | 1.0 | |
| Aminox [4] | 1.0 | |

[1] "Translink-37" is a specially treated complex aluminium silicate supplied by Freeport Kaolin Co. It is a non-black filler.
[2] "DiCup 40 C" is a peroxide curing agent comprising about 40% dicumyl peroxide supported on a precipitated calcium carbonate and is supplied by Hercules Powder Co., Inc.
[3] Triallyl cyanurate has been claimed to act as a "co-agent" in peroxide cures, producing a better state of cure.
[4] "Aminox" is a diphenyl amine/acetate condensation product used as a stabilizer and is supplied by the Naugatuck Chemical Division of United States Rubber Company.

The stress-strain properties of the cured sheets were measured and the results obtained are given below in Table I. The comment "degraded" against certain of the polymers means that the test sheets were so weak that they could not be removed from the press plates.

EXAMPLE II

A terpolymer of isobutylene, isoprene and divinyl benzene was prepared from a monomer mixture comprising about 6% of commercial divinyl benzene containing about 55% of divinyl benzene, about 3% of isoprene and the remainder isobutylene. The process of preparation was similar to that described in U.S. patent specification No. 2,729,626. The resulting polymer was light yellow in colour and was very tough. The raw polymer had a Mooney viscosity (ML-8' at 100° C.) of about 85 and was insoluble in toluene. The solubility of the polymer in cyclohexane was in the region of 20%.

The polymer was compounded with different levels of peroxide curing agents as follows:

| | Ingredient | Sample A | Sample B | Sample C |
|---|---|---|---|---|
| 1 | Terpolymer | 100 | 100 | 100 |
| 2 | "Aminox" | 0.75 | 0.75 | 0.75 |
| 3 | Zinc mercapto benzimidazole | 2.0 | 2.0 | 2.0 |
| 4 | Magnesium oxide (stabilizer) | 1.0 | 1.0 | 1.0 |
| 5 | Medium thermal carbon black | 45.0 | 45.0 | 45.0 |
| 6 | Fast extruding furnace carbon black | 30.0 | 30.0 | 30.0 |
| 7 | "DiCup" 40 C | 1.5 | 3.0 | 4.5 |

The ingredients were mixed in a Model B Banbury operating with a rotor speed of 77 r.p.m. and having an initial chamber temperature of 82° C. using the following mixing procedure:

0 minutes—Add terpolymer
½ minute—Add ingredients 2, 3 and 4
1 minute—Add half of carbon blacks
3½ minutes—Add remaining carbon blacks
5½ minutes—Clean ram
6½ minutes—Discharge

TABLE I

| Polymer description | Recipe | Cure time, minutes | Tensile strength, kg./cm.² | Percent elongation | 100% modulus, kg./cm.² | 300% modulus, kg./cm.² |
|---|---|---|---|---|---|---|
| Terpolymer containing divinyl benzene, isoprene and isobutylene | 1 | 5 | 44.7 | 600 | 6.8 | 22.6 |
| | | 10 | 42.9 | 430 | 9.8 | 32.6 |
| | | 20 | 42.8 | 510 | 7.0 | 23.0 |
| Copolymer containing divinyl benzene and isobutylene | 1 | 5 | 47.2 | 480 | 10.9 | 31.8 |
| | | 10 | 40.9 | 420 | 7.7 | 26.1 |
| | | 20 | 37.1 | 400 | 7.8 | 27.5 |
| Terpolymer containing divinyl benzene, isoprene and isobutylene | 2 | 5 | 40.3 | 475 | 10.1 | 29.5 |
| | | 10 | 45.3 | 500 | 8.9 | 27.6 |
| | | 20 | 47.6 | 475 | 10.9 | 35.8 |
| Copolymer containing divinyl benzene and isobutylene | 2 | 5 | 57.0 | 475 | 10.7 | 38.2 |
| | | 10 | 55.8 | 500 | 6.6 | 26.8 |
| | | 20 | 48.1 | 450 | 7.2 | 33.3 |
| Terpolymer containing sytrene, isoprene and isobutylene | 2 | 5 | 1.4 | >1200 | 3.5 | 2.9 |
| | | 10 | | | | |
| | | 20 | | | | |
| Polyisobutylene | 1 and 2 | (¹) | (¹) | (¹) | (¹) | (¹) |
| Copolymer containing isoprene and isobutylene | 1 and 2 | (¹) | (¹) | (¹) | (¹) | (¹) |
| Terpolymer containing vinyl toluene, isoprene and isobutylene | 1 and 2 | (¹) | (¹) | (¹) | (¹) | (¹) |
| Copolymer containing vinyl toluene and isobutylene | 1 and 2 | (¹) | (¹) | (¹) | (¹) | (¹) |
| Copolymer containing styrene and isobutylene | 1 and 2 | (¹) | (¹) | (¹) | (¹) | (¹) |

¹ Degraded.

The results summarized in Table I indicate that the polymers containing a divinyl aromatic compound, which can contain free vinyl groups pendant upon an aromatic ring, vulcanize by a free-radical mechanism in the presence of organic peroxide curing agents.

The peroxide curing agent was added on a cold mill. The stress-strain properties, compression set, air ageing, low temperature and ozone resistance properties were measured in accordance with suitable ASTM procedures.

The results obtained were as follows:

TABLE II

| | Sample | | |
|---|---|---|---|
| | A | B | C |
| Compound properties: | | | |
| Compound viscosity (ML-4' at 100° C.) | 72 | 70 | 66 |
| Mooney scorch time (mins. at 125 °C.) | >25 | 23.5 | 4.5 |
| Unaged vulcanizate properties: | | | |
| Cure time (mins. at 166° C.) | 12 | 9 | 7 |
| Hardness, Shore $A_2$ (inst.) | 63 | 64 | 63 |
| Modulus at 100% elongation (kg./cm.$^2$) | 35 | 42 | 41 |
| Tensile strength (kg./cm.$^2$) | 52 | 52 | 52 |
| Elongation at break (percent) | 190 | 150 | 160 |
| Compression set ASTM-B (percent) | | | |
| 22 hrs. at 100° C | 8 | 7 | 8 |
| 70 hrs. at 100° C | 9 | 10 | 13 |
| Aged vulcanizate properties: | | | |
| Aged in air 70 hrs. at 135° C. (change) | | | |
| Hardness, Shore $A_2$, inst. (pts.) | +4 | +5 | +6 |
| Modulus at 100% elong. (percent) | +44 | +27 | +29 |
| Tensile strength (percent) | +30 | +34 | +22 |
| Elongation at break (percent) | −37 | −13 | −13 |
| Gehman low temperature properties (° C.): | | | |
| $T_2$ | −34 | −34 | −37 |
| $T_5$ | −44 | −44 | −46 |
| $T_{10}$ | −49 | −48 | −49 |
| $T_{100}$ | −59 | −59 | −61 |
| Freeze point | −59 | −59 | −59 |
| Ozone resistance 50 p.p.h.m. at 40° C., hours to first crack at percent strain: | | | |
| 0 to 5 | >168 | >168 | >168 |
| 5 to 10 | >168 | >168 | >168 |
| 10 to 15 | >168 | >168 | >168 |
| 15 to 20 | >168 | >168 | >168 |
| 20 to 25 | >168 | >168 | >168 |
| 30 to 35 | >168 | >168 | >168 |
| 35 to 40 | >168 | >168 | >168 |
| Threshold Strain (percent) | >40 | >40 | >40 |

It can be seen from the figures for compound viscosity that at the higher levels of peroxide curing agent (level increases from A through B to C) there is slight reversion of the polymer. The lower levels of peroxide, while resulting in slower cures, develop almost the same modulus. The levels of peroxide curative used had little effect on the unaged stress-strain properties when the compounds were cured at their optimum rates. It can also be seen that the peroxide vulcanized compounds possess good properties of heat resistance, ozone resistance and compression set.

EXAMPLE III

A terpolymer of isobutylene, isoprene and divinyl benzene was produced in a similar manner to the terpolymer described in Example II but the monomer mixture comprised commercially available divinyl benzene in an amount representing only about 2% of divinyl benzene itself and 4% of isoprene with the remainder being isobutylene.

The terpolymer obtained had a Mooney viscosity (ML-8' at 100° C.) of about 72 and a solubility in the region of 50%. It was compounded with different levels of peroxide curing agent using the same basic recipe as is given in Example II. Five different levels of DiCup 40 C were used, namely 1.5 parts (Sample A); 3.0 parts (Sample B); 4.5 parts (Sample C); 1.0 parts (Sample D) and 0.75 parts (Sample E). The compounds were vulcanized and the properties of the vulcanizates are summarized in Table III.

TABLE III

| | Sample | | | | |
|---|---|---|---|---|---|
| | A | B | C | D | E |
| Compound properties: | | | | | |
| Compound viscosity (ML-4' at 100° C.) | 95 | 98 | 89 | 102 | 98 |
| Mooney scorch time (mins. at 125° C.) | >25 | 24 | 19 | >25 | >25 |
| Unaged vulcanizate properties: | | | | | |
| Cure time (mins. at 166° C.) | 12 | 9 | 7 | 14 | 18 |
| Hardness, Shore $A_2$ (inst.) | 51 | 49 | 50 | 54 | 54 |
| Modulus at 100% elong. (kg./cm.$^2$) | 10 | 13 | 13 | 13 | 13 |
| Modulus at 300% elong. (kg./cm.$^2$) | 47 | 53 | 56 | 45 | 42 |
| Tensile strength (kg./cm.$^2$) | 77 | 79 | 76 | 68 | 68 |
| Elongation at break (percent) | 520 | 510 | 460 | 510 | 540 |
| Compression set ASTM-B (percent) | | | | | |
| 22 hrs. at 100° C | 12 | 14 | 10 | 16 | 18 |
| 70 hrs. at 100° C | 17 | 28 | 19 | 23 | 24 |
| Aged vulcanizate properties: | | | | | |
| Aged in air 70 hrs. at 177° C. (change) | | | | | |
| Hardness, Shore $A_2$, inst. (pts.) | | | | −2 | (¹) |
| Modulus at 100% elong. (percent) | | | | −8 | −8 |
| Tensile strength (percent) | | | | −41 | −40 |
| Elongation at break (percent) | | | | −26 | −26 |
| Aged in air 70 hrs. at 135° C. (change) | | | | | |
| Hardness, Shore $A_2$ inst. (pts.) | +4 | +8 | +5 | +2 | +2 |
| Modulus at 100% elong. (percent) | +36 | +11 | +5 | +11 | +6 |
| Tensile strength (percent) | −7 | −11 | −7 | −6 | −6 |
| Elongation at break (percent) | −23 | −22 | −15 | −22 | −24 |
| Gehman low temp. properties (° C.) | | | | | |
| $T_2$ | −17 | −20 | −20 | | |
| $T_5$ | −38 | −38 | −37 | | |
| $T_{10}$ | −44 | −44 | −44 | | |
| $T_{100}$ | −55 | −56 | −56 | | |
| Freeze point | −54 | −54 | −54 | | |
| Ozone resistance 50 p.p.h.m. at 40° C., hours to first crack at percent strain | | | | | |
| 0 to 5 | >168 | >168 | >168 | >168 | >168 |
| 5 to 10 | >168 | >168 | >168 | >168 | >168 |
| 10 to 15 | 120 | 168 | >168 | >120 | <24 |
| 15 to 20 | 24 | 24 | 120 | <24 | <24 |
| 20 to 25 | <24 | <24 | 24 | <24 | <24 |
| 25 to 30 | | | | <24 | <24 |
| 30 to 35 | <24 | <24 | <24 | <24 | <24 |
| 35 to 40 | <24 | <24 | <24 | <24 | <24 |
| Threshold strain (percent) | 10 | 10 | 15 | 10 | 10 |

¹ No change.

As can be seen from the entries in Table II, the effect of reducing the peroxide level was comparatively slight. The unaged and aged stress-strain properties, compression set and ozone resistance are very similar for all compounds. The time to optimum cure appears to be the only property significantly affected.

When the results summarized in Tables II and III are compared, it is possible to conclude that the presence in the isobutylene, isoprene and divinyl benzene terpolymer of a smaller proportion of the divinyl aromatic compound results generally in improved unaged stress-strain properties but lower aged properties including compression set, air ageing and ozone resistance.

EXAMPLE IV

In this example, the properties of a peroxide cured "cross-linked butyl" are compared with the properties of a cured "regular butyl." Since peroxide curing agents degrade regular butyl grades a straight comparison is not possible. For this reason both a regular butyl and a cross-linked butyl were cured with a sulphur curing system and, in addition, the cross-linked butyl was cured with a peroxide curing system. The actual compounds used were as follows:

|  | Sample | | |
| --- | --- | --- | --- |
|  | A | B | C |
| "Regular" butyl [1] | 100.0 | | |
| "Cross-linked" butyl [2] |  | 100.0 | 100.0 |
| Aminox | 0.75 | 0.75 | 0.75 |
| Zinc mercapto benzimidazole | 2.0 | 2.0 | 2.0 |
| Light magnesium oxide | 1.0 | 1.0 | 1.0 |
| Medium thermal black | 45.0 | 45.0 | 45.0 |
| Fast extruding furnace black | 30.0 | 30.0 | 30.0 |
| Stearic acid | 1.0 | 1.0 | Nil |
| Zinc oxide | 5.0 | 5.0 | Nil |
| Tetramethyl thiuram disulphide | 1.9 | 1.9 | Nil |
| Copper diethyl dithiocarbamate | 1.1 | 1.1 | Nil |
| Sulphur | 1.0 | 1.0 | Nil |
| DiCup 40 C | Nil | Nil | 3.0 |

[1] The "regular" butyl was "Polysar" butyl 301 ("Polysar" is a Registered Trade Mark), had a viscosity (ML–12' at 125° C.) of 52, a molecular unsaturation of 1.6% and contained a non-staining stabilizer.
[2] The "cross-linked" butyl was the same as that described and used in Example II.

The various ingredients were compounded in a manner similar to that described in Example II and the compounds were cured in conventional manner. The physical properties of the vulcanizates were measured and the results are given in Table IV which follows:

TABLE IV

|  | Sample | | |
| --- | --- | --- | --- |
|  | A | B | C |
| Cure system | Sulphur | Sulphur | Peroxide |
| Cure time in minutes at 165° C | 30 | 30 | 9 |
| Vulcanizate properties: | | | |
| Tensile strength (kg./cm.²) | 94 | 98 | 52 |
| Modulus at 100% elong. (kg./cm.²) | 17.5 | 32 | 41.5 |
| Percent elongation at break | 600 | 250 | 190 |
| Compression set ASTM-B (percent) 22 hours at 100° C | 53 | 37 | 7 |
| Ozone resistance: 50 p.p.m. ozone at 40° C. | | | |
| Hours to first crack at percent strain | | | |
| 0 to 5 | 168 | >168 | >168 |
| 5 to 10 | 168 | >168 | >168 |
| 10 to 15 | 120 | >168 | >168 |
| 35 to 40 | <100 | >168 | >168 |

As can be seen from these results, the elongation at break for the cross-linked butyl vulcanizates is low as is the tensile strength of the peroxide vulcanizate. However, there is a dramatic improvement in ozone resistance for the cross-linked butyl vulcanizates over the regular vulcanizate and compression set properties of the peroxide vulcanizate are remarkably good. In addition, it can be seen that not only does the peroxide curing system offer much shorter curing times but also makes possible much more simple compounding recipes.

The high temperature ageing properties of free-radical cured, cross-linked butyl vulcanizates are, in general, very good as also are the compression set properties and ozone resistance. Thus, it may be said that for a given level of unsaturation the free-radical curing of cross-linked butyl provides for improved compression resistance and improved ozone resistance over a regular butyl having a similar unsaturation level when cured in conventional manner. Indeed, the high temperature ageing properties of free-radical-cured vulcanizates rival those of resin cured regular butyl. Now for uses of regular butyl involving extended high temperature service while exposed to oxygen it has hitherto been almost mandatory to use resin cures. Such resin cures can be slow and difficult to control satisfactorily and the present invention accordingly provides an alternative, easily managed and rapid, curing system which enables vulcanizates to be obtained which are of value in applications where good high temperature ageing properties are at a premium. As an example of such application mention may be made of, for example, tire curing bags and bladders.

The preceding examples have illustrated compositions which comprise a cross-linked butyl polymer as the sole vulcanizable component. In the examples which follow there are illustrated compositions which, in addition to containing a cross-linked butyl, contain other polymers which are vulcanizable by free-radical curing agents.

EXAMPLE V

The isobutylene terpolymer described in Example II was compounded with various other polymers in accordance with the following recipes:

TABLE V

|  | Sample | | | | |
| --- | --- | --- | --- | --- | --- |
| Ingredient | A | B | C | D | E |
| Isobutylene terpolymer | 80.0 | 80.0 | 80.0 | 80.0 | 80.0 |
| Ethylene/vinyl acetate copolymer [1] | 20.0 | | | | |
| Number 1 smoked sheet | | 20.0 | | | |
| Ethylene/propylene nonconjugated diene terpolymer [2] | | | 20.0 | | |
| Butadiene/acrylonitrile copolymer [3] | | | | 20.0 | |
| Butadiene/styrene copolymer [4] | | | | | 20.0 |
| Translink-37 | 50.0 | 50.0 | 50.0 | 50.0 | 50.0 |
| DiCup 40 C | 1.5 | 1.5 | 1.5 | 1.5 | 1.5 |
| Specific gravity (vulc.) | 1.18 | 1.16 | 1.14 | 1.17 | 1.16 |

[1] The ethylene/vinyl acetate copolymer was Elvax-250, supplied by E. I. du Pont de Nemours & Company. It contains 72% ethylene and 28% vinyl acetate and has a melt index (ASTM-1238–62T) of 15, a density at 23° C. of 0.951 gm./cc. and an inherent viscosity of 0.85.
[2] The ethylene/propylene/diene terpolymer was Nordel 1040 and is supplied by E.I. du Pont de Nemours & Company. It is a low viscosity product (ML–4 at 120° C.=40).
[3] The butadiene/acrylonitrile copolymer was Krynac 800 produced by Polymer Corporation Limited and containing 34% bound acrylonitrile and a non-staining stabilizer. It had a viscosity (ML–4' at 100° C.) of 83.
[4] The butadiene/styrene copolymer was Krylene NS produced by Polymer Corporation Limited and containing 28% bound styrene and a non-staining stabilizer. It had a viscosity (ML–4' at 100° C.) of 52.

The compounds were mixed in a Model B Banbury at 77 r.p.m. The initial chamber temperature was about 95° C. and the following procedure was followed:

0 minutes—Polymers added
1 minute—½ filler added
2 minutes—Remaining filler added
3 minutes—Brush ram and hopper
4 minutes—Dump, sheet and cool The peroxide curing agent was added on a cool mill. Tensile sheets were prepared from the compounds and were cured for 5, 10 and 20 minutes at 166° C. and measured for stress-strain. Compression set buttons cured for 15 minutes were measured for compression set (ASTM Method B) at 100° C. after 48 hours. The results are summarized in Table VI below.

As can be seen from the results given in Table VII, the result of adding carbon black fillers to blends of cross-linked butyl and a butadiene/acrylonitrile copoly-

TABLE VI

| | Cure time (min. at 166° C.) | A | B | C | D | E |
|---|---|---|---|---|---|---|
| Compound properties: | | | | | | |
| Compound viscosity (ML-4' at 100° C.) | | 60.5 | 48.5 | 91.0 | 60.0 | 59.0 |
| Mooney scorch time (min. at 125° C.) | | 14'15" | 5'51" | 17'20" | 21'54" | 8'24" |
| Optimum cure time (90%) min | | 9 | 13 | 7 | 12 | 11 |
| Unaged vulcanizate properties: | | | | | | |
| Hardness, Shore A₂ (inst.) | 5 | 55 | 46 | 48 | 48 | 48 |
| | 10 | 56 | 47 | 49 | 49 | 49 |
| | 20 | 57 | 48 | 49 | 50 | 50 |
| Modulus at 100% elong. (kg./cm.²) | 5 | 14 | 9 | 56 | 11 | 11 |
| | 10 | 16 | 14 | 42 | 11 | 11 |
| | 20 | 13 | 14 | 72 | 14 | 14 |
| Tensile strength (kg./cm.²) | 5 | 32 | 37 | 43 | 41 | 32 |
| | 10 | 32 | 36 | 34 | 42 | 32 |
| | 20 | 36 | 32 | 25 | 37 | 36 |
| Elongation at break (percent) | 5 | 190 | 200 | 350 | 300 | 190 |
| | 10 | 180 | 200 | 320 | 290 | 180 |
| | 20 | 230 | 170 | 260 | 220 | 230 |
| Compression Set ASTM-B (percent), 48 hrs. at 100° C., 25% comp. | | 15 | 19 | 15 | 16 | 15 | 11 |

The results summarized in Table VI provide evidence that, despite the comparatively low tensile strength values, the crosslinked butyl terpolymer successfully covulcanizes with the additional polymer in the presence of a peroxide curing agent as the sole curing agent.

EXAMPLE VI

The tensile strengths of vulcanizates obtained as described in Example V above may be improved by blending with reinforcing fillers such as high abrasion furnace (HAF), fast extrusion furnace (FEF) and medium thermal (MT) carbon blacks. This is illustrated by reference to Table VII which follows:

mer was to improve significantly the tensile strengths of the vulcanizates. The vulcanizates had very good compression set properties and good aging properties.

EXAMPLE VII

In this example the effect of various levels of peroxide curing agent on a blend of cross-linked butyl and polyethylene was studied. Blends were formulated in accordance with the recipe given in Table VIII by a procedure similar to that described in Example V.

TABLE VII

| | Cure time (min. at 166° C.) | Sample A | B | C |
|---|---|---|---|---|
| Ingredients: | | | | |
| Isobutylene terpolymers ¹ | | 80.0 | 80.0 | 80.0 |
| Butadiene acrylonitrile copolymer ² | | 20.0 | 20.0 | 20.0 |
| HAF Black | | 50.0 | | |
| FEF Black | | | 50.0 | |
| MT Black | | | | 50.0 |
| DiCup 40 C | | 1.5 | 1.5 | 1.5 |
| Specific gravity (vulc.) | | 1.09 | 1.11 | 1.12 |
| Mixing (Banbury Model B): | | | | |
| Max. mixing temp. (° C.) | | 115 | 145 | 127 |
| Max. power demand (kw.) | | 6.0 | 8.4 | 6.8 |
| Compound properties: | | | | |
| Compound viscosity (ML-4' at 100° C.) | | 99.0 | 115.5 | 59.0 |
| Mooney scorch time (min. at 125° C.) | | 13'39" | 6'19" | 12'18" |
| Optimum cure time (90%) min | | 13 | 13 | 12 |
| Unaged vulcanizate properties: | | | | |
| Hardness₂ Shore A₂ (inst.) | 5 | 65 | 66 | 52 |
| | 10 | 66 | 68 | 53 |
| | 20 | 67 | 69 | 54 |
| Modulus at 100% elong. (kg./cm.²) | 5 | 36 | 36 | 22 |
| | 10 | 42 | 45 | 25 |
| | 20 | 46 | 53 | 30 |
| Tensile strength (kg./cm.²) | 5 | 77 | 99 | 63 |
| | 10 | 82 | 97 | 63 |
| | 20 | 81 | 102 | 62 |
| Elongation at break (percent) | 5 | 220 | 230 | 230 |
| | 10 | 200 | 180 | 190 |
| | 20 | 160 | 170 | 170 |
| Compression set ASTM-B (percent), 48 hrs. at 100° C., 25% comp. | 15 | 14 | 12 | 13 |
| Aged vulcanizate properties: | | | | |
| Cure, 10 min. at 166° C. | | | | |
| Test tube air aged 70 hrs. at 120° C. (change): | | | | |
| Hardness, Shore A₂ inst. (pts.) | | +4 | +3 | +2 |
| Modulus at 100% elong. (percent) | | +23 | +24 | +41 |
| Tensile strength (percent) | | −12 | −12 | −11 |
| Elongation at break (percent) | | −15 | −14 | −14 |

¹ The isobutylene terpolymer used was that described in Example II.
² The butadiene/acrylonitrile copolymer used was Krynac 800 (see also Table V).

TABLE VIII

| Ingredient: | Parts |
|---|---|
| Isobutylene terpolymer [1] | 40 |
| Polyethylene [2] | 60 |
| Medium thermal carbon black | 50 |
| Agerite Resin D [3] | 0.5 |
| DiCup 40 C | (4) |

[1] The isobutylene terpolymer was that described in Example II.
[2] The polyethylene used was CIL 220 G which is supplied by Canadian Industries Limited. It has a density of 0.920 gm./cc. and a melt index (ASTM-1238-62T) of 2.0.
[3] Agerite Resin D is an antioxidant supplied by the R. T. Vanderbilt Co., Inc. It is a polymerized trimethyl dihydroquinoline.
[4] As shown in Table IX.

Tensile sheets were cured and measured for stress-strain before and after aging in test tubes for 70 hours at 120° C. (ASTM D 865). The compression set test (ASTM Method B) was carried out at 100° C. for 48 hours.

The results of the tests are summarized in Table IX below.

TABLE IX

|  | Cure time (min. at 166° C.) | Sample | | | |
|---|---|---|---|---|---|
|  |  | A | B | C | D |
| DiCup 40 C (parts) |  | 1.0 | 2.0 | 4.0 | 5.0 |
| Specific gravity (vulc.) |  | 1.02 | 1.04 | 1.05 | 1.97 |
| Compound properties: Compound Mooney viscosity (ML-4' at 100° C.) |  | 114 | 107 | 106 | 108 |
| Monsanto rheometer: |  |  |  |  |  |
| Cure rate (50% of 30 min. torque value minutes) |  | 9'15" | 6'0" | 5'45" | 6'15" |
| Cure rate (90% of 30 min. torque value minutes) |  | 18' | 17'30" | 15'45" | 16'45" |
| Induction time (2.28 cm./kg. rise from min. viscosity seconds) |  | 105 | 75 | 60 | 70 |
| Min. to max. viscosity (cm./kg.) |  | 15.5 | 22.3 | 37.6 | 33.7 |
| Unaged vulcanizate properties: |  |  |  |  |  |
| Hardness, Shore A2 (inst.) | 5 | 92 | 89 | 90 | 88 |
|  | 10 | 92 | 90 | 90 | 89 |
|  | 20 | 93 | 90 | 91 | 90 |
| Modulus at 100% elong. (kg./cm.²) | 5 | 57 | 63 | 69 | 76 |
|  | 10 | 58 | 67 | 65 | 76 |
|  | 20 | 65 | 70 | 65 | 74 |
| Tensile strength (kg./cm.²) | 5 | 82 | 84 | 98 | 107 |
|  | 10 | 81 | 90 | 104 | 114 |
|  | 20 | 81 | 98 | 101 | 113 |
| Elongation at break (percent) | 5 | 380 | 300 | 250 | 250 |
|  | 10 | 320 | 260 | 250 | 290 |
|  | 20 | 230 | 290 | 250 | 260 |
| Compression set, ASTM-B (percent), 48 hrs. at 100° C., 25% comp. | 15 | 74 | 69 | 60 | 58 |
| Aged vulcanizate properties: |  |  |  |  |  |
| Cure time, 17 min. |  |  |  |  |  |
| Test tube air aged, 70 hrs. at 120° C. (change). |  |  |  |  |  |
| Hardness, Shore A2 inst. (pts.) |  | +3 | +2 | +2 | +5 |
| Modulus at 100% elong. (percent) |  | +16 | +15 | +13 | +15 |
| Tensile strength (percent) |  | +4 | +1 | −2 | −1 |
| Elongation at break (percent) |  | − | −24 | +4 | −19 |

As can be seen from the results summarized in Table IX the level of 4 parts per hundred polymer of curing agent (corresponding to 1.6 parts per hundred polymer of peroxide) gave the fastest cure and the shortest induction time. In addition this level of curative gave the highest value in the difference from minimum viscosity to maximum viscosity. Furthermore, the vulcanizate obtained using 4 parts per hundred polymer of curing agent provides the best balance of unaged and aged hardness, moduli, tensile strength and elongation at break.

We claim:

1. A vulcanizable composition comprising (a) from 5 to 100% by weight of a copolymer prepared by copolymerizing 80 to 99.8% by weight of an isoolefin of 4 to 7 carbon atoms, 0 to 19.8% by weight of an aliphatic diene of from 4 to 14 carbon atoms and from 0.2 to 5% by weight of an aromatic divinyl compound of the formula:

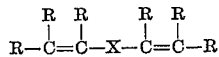

wherein the symbol X represents an aromatic nucleus and the symbols R, which may be the same or different, represent hydrogen atoms or alkyl groups of 1 to 5 carbon atoms, (b) correspondingly 0 to 95% by weight of a rubbery or resinous polymer vulcanizable by a free-radical curing agent and (c) from 0.05 to 5 parts by weight of a free-radical curing agent, based on 100 parts by weight of the ingredients (a) and (b).

2. A vulcanizable composition as claimed in claim 1, wherein the aliphatic diene is isoprene in an amount of 1 to 5% by weight and the aromatic divinyl compound is divinyl benzene in an amount of from 0.5 to 3% by weight.

3. A vulcanizable composition as claimed in claim 1, wherein the curing agent is an organic peroxide curing agent and is present in an amount of from 0.2 to 3 parts by weight, based on 100 parts by weight of the ingredients (a) and (b).

4. A vulcanizable composition as claimed in claim 3, wherein the peroxide curing agent is selected from dicumyl peroxide and ditertiary butyl peroxide.

5. A vulcanizable composition as claimed in claim 1, wherein the polymer (b) is selected from a solid polyethylene, styrene/butadiene copolymers, butadiene/acrylonitrile copolymers, ethylene/vinyl acetate copolymers, natural rubber and ethylene/propylene copolymers.

6. A vulcanizable composition as claimed in claim 1, which comprises up to 150 parts by weight of filler per 100 parts by weight of the ingredients (a) and (b).

7. A vulcanizable composition comprising (a) from 10 to 45% by weight of a copolymer prepared by copolymerizing 94.8 to 99.8% by weight of isobutylene, 0 to 5% by weight of isoprene and 0.2 to 3% by weight of divinyl benzene, (b) correspondingly from 90 to 55% by weight of a solid polyethylene, and (c) from 0.2 to 3 parts by weight of an organic peroxide curing agent, based on 100 parts by weight of the ingredients (a) and (b).

8. A vulcanizable composition as claimed in claim 7 wherein the peroxide curing agent is dicumyl peroxide and is present in an amount of from 0.2 to 2 parts by weight, based on 100 parts by weight of the ingredients (a) and (b).

9. A process for preparing vulcanizates which comprises heating to an elevated temperature a composition comprising (a) from 5 to 100% by weight of a copolymer prepared by copolymerizing 80 to 99.8% by weight of an isoolefin of 4 to 7 carbon atoms, 0 to 19.8% by weight of an aliphatic diene of from 4 to 14 carbon atoms and from 0.2 to 5% by weight of an aromatic divinyl compound of the formula:

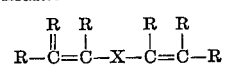

wherein the symbol X represents an aromatic nucleus and the symbols R, which may be the same or different, represent hydrogen atoms or alkyl groups of 1 to 5 carbon atoms, (b) correspondingly 0 to 95% by weight of a rubbery or resinous polymer vulcanizable by a free-radical curing agent and (c) from 0.05 to 5 parts by weight of a free-radical curing agent, based on 100 parts by weight of the ingredients (a) and (b).

10. Vulcanizates obtained by heating at an elevated temperature a composition comprising (a) from 5 to 100% by weight of a copolymer prepared by copolymerizing 80 to 99.8% by weight of an isoolefin of 4 to 7 carbon atoms, 0 to 19.8% by weight of an aliphatic diene of from 4 to 14 carbon atoms and from 0.2 to 5% by weight of an aromatic divinyl compound of the formula:

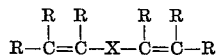

wherein the symbol X represents an aromatic nucleus and the symbols R, which may be the same or different, represent hydrogen atoms or alkyl groups of 1 to 5 carbon atoms, (b) correspondingly 0 to 95% by weight of a rubbery or resinous polymer vulcanizable by a free-radical curing agent and (c) from 0.05 to 5 parts by weight of a free-radical curing agent, based on 100 parts by weight of the ingredients (a) and (b).

11. Vulcanizates as claimed in claim 10 obtained by heating to a temperature of from 130° C. to 200° C. for up to 60 minutes a composition which comprises (a) from 5 to 100% by weight of a copolymer prepared by copolymerizing 94.8 to 99.8% by weight of isobutylene, 0 to 5% by weight of isoprene and 0.2 to 4% by weight of divinyl benzene, (b) correspondingly 0 to 95% by weight of a polymer vulcanizable by a free-radical curing agent selected from the group consisting of a solid polyethylene, styrene/butadiene copolymers, butadiene/acrylonitrile copolymers, ethylene/vinyl actate copolymers, natural rubber and ethylene/propylene copolymers and (c) from 0.2 to 3 parts by weight of an organic peroxide curing agent, based on 100 parts by weight of ingredients (a) and (b).

12. Vulcanizates as claimed in claim 10 obtained by heating to a temperature of from 130° C. to 200° C. for up to 60 minutes a composition which comprises (a) from 10 to 45% by weight of a copolymer prepared by copolymerizing 94.8 to 99.8% by weight of isobutylene, 0 to 5% by weight of isoprene and 0.2 to 4% by weight of divinyl benzene, (b) correspondingly from 90 to 55% by weight of a solid polyethylene, and (c) from 0.2 to 3 parts by weight of an organic peroxide curing agent, based on 100 parts by weight of the ingredients (a) and (b).

References Cited
UNITED STATES PATENTS
2,671,774 3/1954 McCracken et al. ____ 260—80.7
3,265,770 8/1966 Edwards _____ 260—889

MURRAY TILLMAN, Primary Examiner

J. SEIBERT, Assistant Examiner

U.S. Cl. X.R.

260—4, 5, 23, 23.5, 41, 41.5, 45.8, 85.1, 94.8, 93.5, 888, 894, 897.